United States Patent
Driehorn et al.

(10) Patent No.: US 7,133,270 B2
(45) Date of Patent: Nov. 7, 2006

(54) ELECTRIC POWER SWITCH WITH AN ELECTRONIC MEMORY UNIT FOR PARAMETERS AND CONVERSION FACTORS

(75) Inventors: Thomas Driehorn, Berlin (DE); Andreas Krauss, Berlin (DE); Aron-Ernst Musiol, Mahlow (Waldblick) (DE); Andreas Pancke, Berlin (DE); Ilka Redmann, Berlin (DE); Wolfgang Röhl, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/513,461

(22) PCT Filed: Apr. 10, 2003

(86) PCT No.: PCT/DE03/01258

§ 371 (c)(1),
(2), (4) Date: Nov. 8, 2004

(87) PCT Pub. No.: WO03/096506

PCT Pub. Date: Nov. 20, 2003

(65) Prior Publication Data
US 2005/0174712 A1 Aug. 11, 2005

(30) Foreign Application Priority Data
May 8, 2002 (DE) ................................ 102 21 572

(51) Int. Cl.
*H02H 3/08* (2006.01)
(52) U.S. Cl. ..................................... 361/93.3; 361/93.2
(58) Field of Classification Search ................. 361/115, 361/92.3, 93.3
See application file for complete search history.

(56) References Cited

U.S. PATENT DOCUMENTS

| 4,958,252 | A | * | 9/1990 | Murphy ..................... 361/93.3 |
| 4,996,464 | A | | 2/1991 | Farrington |
| 5,185,705 | A | | 2/1993 | Farrington |
| 5,303,113 | A | | 4/1994 | Goleman et al. |
| 5,363,334 | A | * | 11/1994 | Alexander et al. ...... 365/185.04 |
| 6,334,165 | B1 | | 12/2001 | Barenys et al. |
| 6,639,775 | B1 | * | 10/2003 | Musiol et al. ............. 361/93.3 |

(Continued)

FOREIGN PATENT DOCUMENTS

DE 197 26 637 A1 12/1998

(Continued)

OTHER PUBLICATIONS

StarterKit-C868, Hardware Manual, Preliminary Edition Jan. 2002, PHYTEC.

(Continued)

*Primary Examiner*—Stephen W. Jackson
*Assistant Examiner*—Terrence Willoughby
(74) *Attorney, Agent, or Firm*—Harness, Dickey & Pierce, P.L.C.

(57) ABSTRACT

An electrical power breaker includes an electronic protective device and an electronic memory. The memory is accommodated in the power breaker such that it is physically separated from said protective device, for operational data for the power breaker. Data security when using the additional electronic memory is increased by the electronic memory being connected to the protective device via a data bus, which can be used to transmit control signals for the purpose of activating or deactivating a write protection device of the electronic memory. The data bus is preferably an I$^2$C bus, and the write protection device is controlled by an I/O module which is likewise controlled by the I$^2$C bus.

4 Claims, 1 Drawing Sheet

U.S. PATENT DOCUMENTS 6,678,135 B1 * 1/2004 Tignor et al. ............... 361/93.3
6,804,101 B1 * 10/2004 Tignor et al. ............... 361/93.3
6,809,913 B1 * 10/2004 Hochgraef et al. ........ 361/93.3

FOREIGN PATENT DOCUMENTS

| DE | 299 21 787 U1 | 5/2001 |
| DE | 299 21 791 U1 | 5/2001 |
| DE | 100 19 092 A1 | 10/2001 |
| DE | 100 27 934 A1 | 12/2001 |
| EP | 0 847 587 B1 | 2/1999 |
| WO | WO 01/78099 | * 10/2001 |

OTHER PUBLICATIONS

James M. Flynn, Understanding and Using the I$^2$C Bus, Embedded Systems Programming, http://www.embedded.com/97/feat9711.htm. pp. 1-9.

* cited by examiner

ELECTRIC POWER SWITCH WITH AN ELECTRONIC MEMORY UNIT FOR PARAMETERS AND CONVERSION FACTORS

This application is the national phase under 35 U.S.C. § 371 of PCT International Application No. PCT/DE03/01258 which has an International filing date of Apr. 10, 2003, which designated the United States of America and which claims priority on German Patent Application number DE 102 21 572.3 filed May 8, 2002, the entire contents of which are hereby incorporated herein by reference.

FIELD OF THE INVENTION

The invention generally relates to an electrical power breaker. Preferably, it relates to one having an electronic protective device and having an electronic memory, which is accommodated in the power breaker such that it is physically separated from the protective device and which can be read and written to by the protective device, for operational data for the power breaker.

BACKGROUND OF THE INVENTION

A power breaker of this type has been disclosed in, for example, DE 100 19 092 A1. The protective device, which, in a known manner, is in the form of an electronic overcurrent release, is in this case located in a front region of the power breaker behind a control panel. On the other hand, current transformers or current sensors, which detect measured values for the current in each of the poles of the power breaker and supply auxiliary power required for operating the protective device, are arranged on the rear side of the power breaker which is opposite the control panel. A cable harness connects these two regions of the power breaker. The electronic memory, which serves the purpose of storing characteristics and conversion factors which are dependent on the physical size and design of the power breaker, is arranged in the path of the cable harness.

A further known application of an electronic memory which is physically separated from the protective device is a rated current plug according to U.S. Pat. No. 4,958,252. In this case, the memory serves the purpose of recording operational events. In particular, the events include the number of switching operations and the level of the respectively interrupted current in order to determine from this the time for required maintenance work to be carried out on the power breaker.

Also known is an electrical switch having an electronic protective device and a memory which are connected via a parallel data bus (U.S. Ser. No. 4,996,646 A).

If an electronic memory of the abovementioned type is arranged in the power breaker such that it is physically separated from the protective device, a connection line or cable harness is required for there to be communication between these units. In this case, the electronic memory can be arranged in the path of the cable harness, as is described in the mentioned DE 100 19 092 A1. All of the interacting components and units are thus subjected to the disruptive influence of the magnetic, electrical and electromagnetic fields occurring in a power breaker. Since the sensitivity of electronic components and circuits to influences of this type is known, shields have been fitted in order to prevent disturbances to the operation of the protective devices (U.S. Ser. No. 5,303,113).

However, the increasing requirements placed on the switching capacity of power breakers lead to the electromagnetic influences on all of the electronic components of a power breaker also being increased correspondingly. Although there is extensive experience in controlling these influences, it appears to be desirable in the interest of safety to increase the electromagnetic compatibility (EMC) in particular of the electronic memory which is arranged separately.

In this case, at the forefront is the consideration that, in the case of communication between the protective device and the memory, address information as well as write and read information can be altered by an interference field which has accidentally been greatly increased. For example, it may be possible for a write operation to take place instead of a read operation without a user being capable of recognizing this. In certain circumstances, it is possible in this way to influence the behavior of the protective device, which can lead to undesired tripping of the power breaker or to this tripping being suppressed even though it is required.

It is obvious per se to eliminate these undesirable influences by using the internal write protection of the electronic memory. The memory modules (EEPROM) have for this purpose a separate input (WC=WRITE CONTROL) which cancels or establishes the write protection depending on the potential applied, as is described, for example, in U.S. Ser. No. 5,363,334. However, in a power breaker, the memory is not accessible, for example in the case of the arrangement in the path of a cable harness according to DE 100 19 092 A1.

It is therefore not possible to use a jumper which is conventionally provided. Even an electrical connection of the write protection input of a memory (EEPROM) is subject to difficulties, since an additional line required for this purpose is not available and undesirable additional complexity is required to install it retrospectively.

SUMMARY OF THE INVENTION

Against this background, an embodiment of the invention is based on the object of using methods/devices which are as simple but as effective as possible to significantly improve data security when using an electronic memory in a power breaker.

According to an embodiment of the invention, an object may be achieved by the electronic memory having a write protection device which can be activated or deactivated via a write protection input of the electronic memory, by the electronic memory being connected to the protective device via a serial data bus, and by the electronic memory having an associated digital I/O module which can likewise be controlled by the protective device via the serial data bus, the output of the I/O module being connected to the write protection input of the electronic memory for the purpose of activating or deactivating the write protection device.

With such a design for the electrical power breaker, there is no additional complexity as regards the connection between the protective device and the memory, since only two conductors are required for data transmission (serial bus). In addition there are two conductors for the power supply, meaning that in total four conductors are required. This number of conductors has also been used to date, but did not allow the write protection of the electronic memory to be used.

In the context of an embodiment of the invention, the data bus may be in the form of an $I^2C$ bus.

The arrangement described in DE 100 19 092 A1, the entire contents of which are hereby incorporated herein by reference, may also be used in the context of an embodiment of the invention, specifically such that the electronic memory in the form of an EEPROM and the digital I/O module are accommodated in a common housing arranged in the path of a four-core cable harness.

BRIEF DESCRIPTION OF THE DRAWINGS

The invention will be explained in more detail below with reference to the exemplary embodiments described below and shown in the figures.

The low-voltage power breaker 1 shown in FIG. 1 has, in a known manner, a housing 2, in which for each pole one switching contact arrangement 3 having an associated arcing chamber 4 and one drive apparatus 5 are accommodated for the purpose of simultaneously actuating all of the switching contact arrangements provided. Each of the switching contact arrangements 3 has an upper connection rail 6 and a lower connection rail 7 in order to connect the power breaker 1 to a circuit. Each of the lower connection rails 7 is provided with a set of transformers 8 which detects the current flowing through the associated switching contact arrangement 3 and in addition supplies auxiliary power for the purpose of operating an electronic overcurrent release 10. For this purpose, each set of transformers 8 comprises a current transformer 11 and a power transformer 12.

Figure 1:
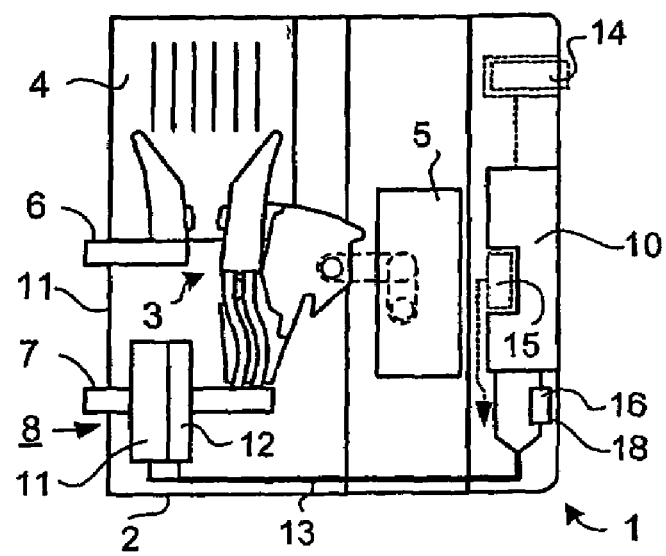

The connection rails 6 and 7 as well as the sets of transformers 8 are located on the rear side of the housing 2, whereas the electronic overcurrent release provided as the protective device 10 is accessible from the opposite front side of the housing 2. For the purpose of connecting the sets of transformers 8 to the protective device 10, a cable harness 13 is provided which is laid in channels which are provided for this purpose in the housing 2 and which bypass the drive apparatus 5 and the switching contact arrangements 3.

Proper interaction between the protective device 10 and the current transformers 11 requires the protective device 10 to process the current signals fed to it using a conversion factor which depends on the rated current for the current transformers, the physical size of the power breaker and, if necessary, further parameters. For this purpose it is known to provide electrical and/or electronic modules which are referred to as the rated current plug (rating plug), the interface module or the switch identification module and which are not arranged in the protective device 10 itself but are connected to it as a peripheral module.

Some of the conventional arrangements are illustrated in FIG. 1. 14 denotes here a rated current plug, for example according to DE 100 27 934 A1 or U.S. Ser. No. 4,958,252. In addition, an information memory of the mentioned type according to EP 0 847 587 B1 (corresponds to U.S. Ser. No. 6,034,859) can be arranged on the rear side of the protective device 10, as is indicated by 15. A further possibility for the arrangement of an information memory is described in DE 100 19 092 A1, according to which the information memory is arranged at 16 in the path of a cable harness connecting the protective device 10 and the set of transformers.

In the embodiment of the mentioned information memory as an electrically erasable programmable read-only memory (EEPROM), according to an embodiment of the present invention significantly improved data security is achieved using the write protection system provided in the electronic memories. Details on this write protection system will be explained in more detail below with reference to FIG. 2.

Figure 2:
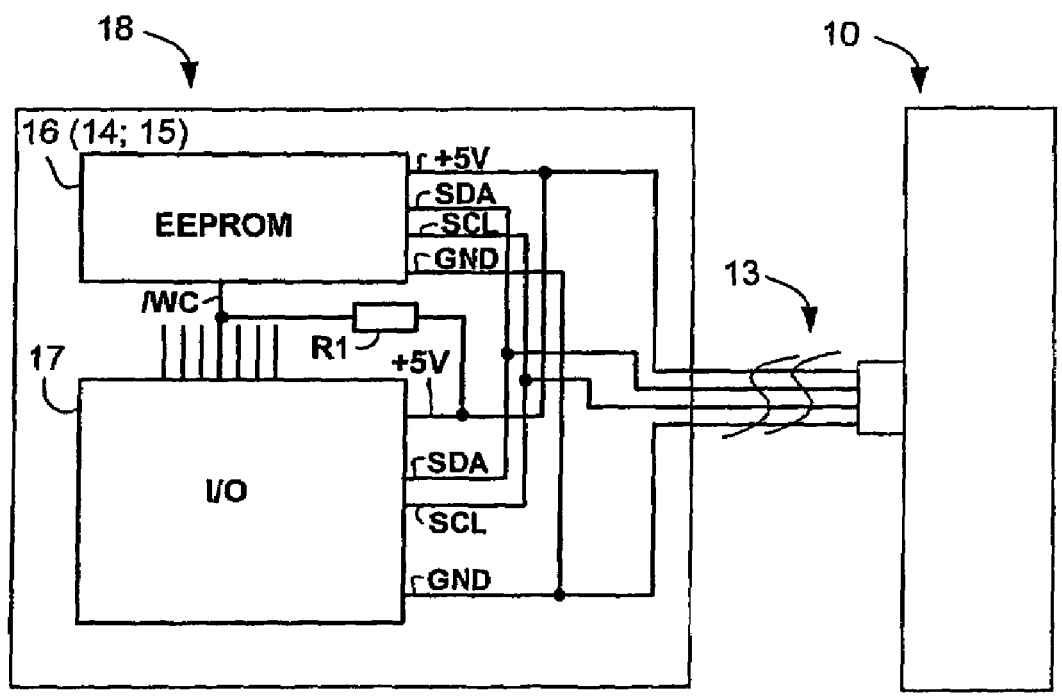

FIG. 2 illustrates the circuit for the electronic memory 16 arranged in the cable harness 13. The memory is accommodated together with an I/O module 17 in a housing 18. Only that part of the cable harness 13 is shown which extends between the housing 18 and the protective device 10, since the part passed on to the current transformers 11 and 12 is not essential to the understanding of an embodiment of the invention. The electronic memory 16 is a memory of the EEPROM (electrically erasable programmable read-only memory) type, specifically with a design envisaged for use with the I$^2$C bus. The I$^2$C bus acts as a series control device for connecting integrated circuits.

Accordingly, the memory 16 has only four connections required for operation, namely two for the power supply and two further connections for data transmission. In FIG. 2, the connections envisaged for the power supply are denoted +5V and GND, whereas the connections envisaged for data transmission are denoted SDA (data) and SCL (clock).

As a further connection, the memory 16 has a connection /WC (write control) which activates the write protection when it is subjected to a high level and deactivates the write protection when it is subjected to a low level, i.e. allows the memory to be written to. The four connections of the memory 16 are connected with corresponding conducting cores of the cable harness 13 to the protective device 10. Controlled by the protective device 10 or using an external operating panel, or one connected to the protective device 10, data can thus be read to and from the memory 16. In particular, this may be data which contains the conversion factor of measured values for the current transformers 11 and further parameters relating to the design of the power breaker 1.

The memory 16 is normally provided with its basic data when the power breaker 1 is produced and equipped at the manufacturer's. During operation, the protective device 10 refers to the stored data, i.e. reads the stored data and processes it together with the measured values, supplied by the set of transformers 8, for the current for tripping purposes in the event of an overcurrent, a ground fault and a short circuit. Changes to the power breaker 1 as regards the current transformers fitted to it or an altered mode of operation may be cause for the stored data in the memory 16 to be altered.

During operation of the power breaker 1 (FIG. 1), the memory content of the memory 16 is thus read regularly. However, this data traffic handled via the cable harness 13, like other electronic modules accommodated in the power breaker 1, is subject to the influence of disruptive magnetic, electrical and electromagnetic fields which emanate from the current-carrying switching contact arrangements and switching arcs in the arcing chambers 4. Similar, although weaker, disruptive influences can emanate from adjacent power breakers considering that power breakers are often incorporated close to one another in switchgear assemblies.

Although during operation over relatively long periods of time it has been established that said interference fields do not impair data traffic between the protective device 10 and the memory 16, it cannot be ruled out that, depending on the level of the interference fields and a statistical coincidence of unfavorable conditions, faults may nevertheless occur. Such a fault may be, for example, a write operation taking place instead of a read operation. If by this means, for example, a stored value representing the conversion factor is altered, this may be cause for tripping in the event of a current which is too low, which can lead to operational faults. If, on the other hand, tripping is shifted to higher current values, this may mean that safety is seriously impaired.

Operations of the described type are largely eliminated according to the invention by a write protection device being used which is provided as standard on the memory 16. This takes place without the number of conductors provided in the cable harness 13 needing to be increased for this purpose. The cable harness provided having four conductors can thus be used without any alterations. The write protection input /WC of the memory 16 is controlled by an additional I/O module 17 which has the same design as the memory 16 for operation using the I$^2$C bus system. Accordingly, the I/O module 17 has the same connections +5V, SDA, SCL and GND. In addition, outputs are provided which the user can use as required.

The write protection connection /WC of the memory 16 is connected directly to one of these outputs. Owing to a connection of the write protection connection /WC of the memory 16 to the connection +5V via a resistor R1, the write protection is normally activated, i.e. it is not possible for data to be read to the memory 16, if such an instruction were to be issued erroneously owing to interference. Only when, via the I$^2$C bus, by means of the cable harness 13 or by way of a plug apparatus fitted to the connection of the cable harness on the housing 18, a control command is transmitted to the I/O module 17 which deactivates the write protection at the input /WC of the memory 16 can the stored data be altered or overwritten in the memory 16 or can additional data be written to said memory 16. As a result of the fact that the memory 16 and the I/O module 17 are accommodated in the immediate vicinity of one another within the housing 18, it can be assumed from this that faults owing to this circuit module being directly subjected to interference fields are improbable.

Where the memory 16 arranged in the path of the cable harness 13 is described above, this is merely to be understood as an example for connection of memories arranged at another point in the power breaker 1. The memories 14 or 15, which are likewise arranged such that they are physically separated from the protective device 10, can thus be combined in the same manner with an I/O module 17 and as a result protected against faulty writing by way of the control via the I$^2$C bus.

LIST OF REFERENCE NUMERALS

1 Power breaker
2 Housing of the power breaker
3 Switching contact arrangement
4 Arcing chamber
5 Drive apparatus
6 Upper connection rail
7 Lower connection rail
8 Set of transformers
10 Protective device
11 Current transformer
12 Power transformer
13 Cable harness
14 Electronic memory (rating plug)
15 Electronic memory (information memory)
16 Electronic memory (switch identification module)
17 I/O module Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrical power breaker comprising:
   an electronic protective device;
   an electronic memory, accommodated in the power breaker such that it is physically separated from the protective device, and which is connected to the protective device via a serial data bus and can be read or written to by the protective device, for operational data for the power breaker, wherein the electronic memory includes,
   a write protection device which can be at least activated and deactivated via a write protection input of the electronic memory, and
   an associated digital I/O module controllable by the protective device via the serial data bus, one output of the I/O module being connected to the write protection input of the electronic memory for the purpose of at least activating or deactivating the write protection device as a whole by the protective device.

2. The electrical power breaker as claimed in claim 1, wherein the serial data bus is in the form of an I$^2$C bus.

3. The power breaker as claimed in claim 1, wherein the electronic memory in the form of an EEPROM and the digital I/O module are accommodated in a common housing arranged in the path of a four-core cable harness.

4. The power breaker as claimed in claim 2, wherein the electronic memory in the form of an EEPROM and the digital I/O module are accommodated in a common housing arranged in the path of a four-core cable harness.

* * * * *